Patented Aug. 19, 1924.

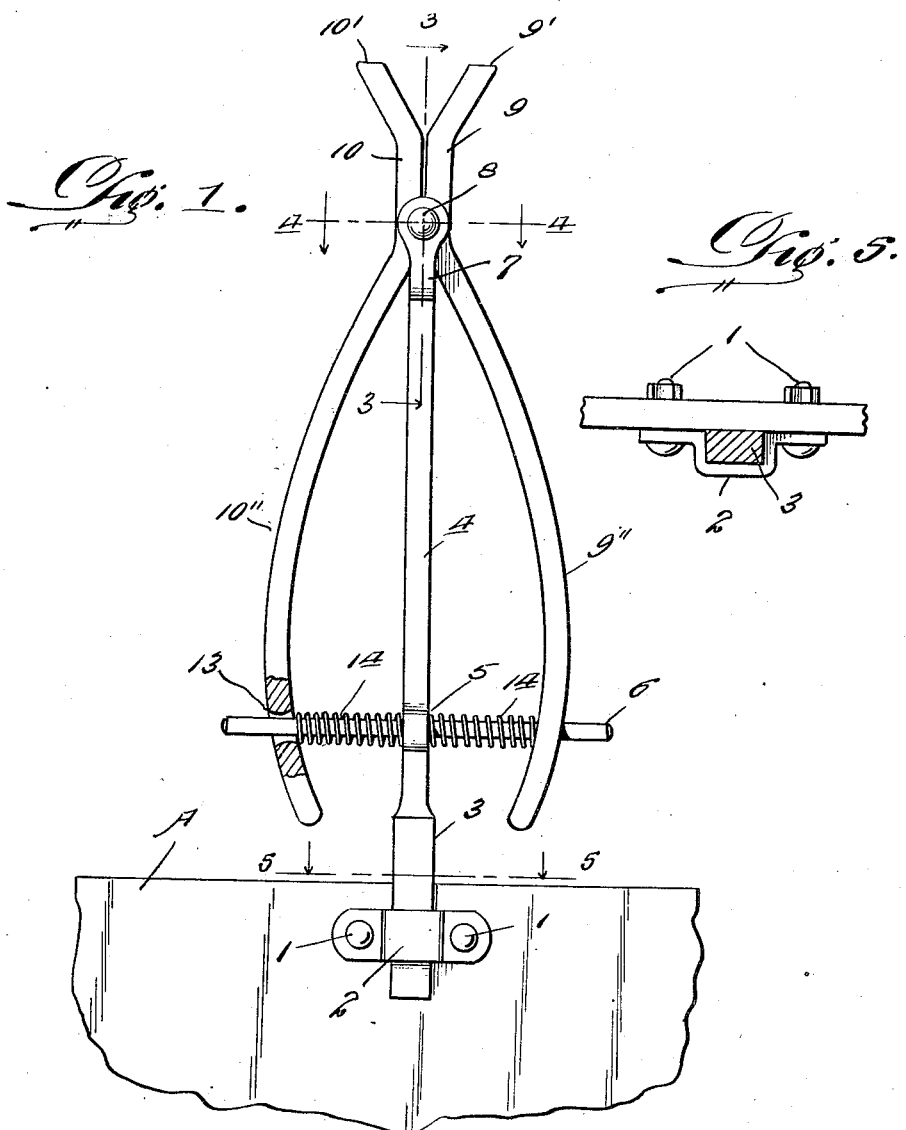

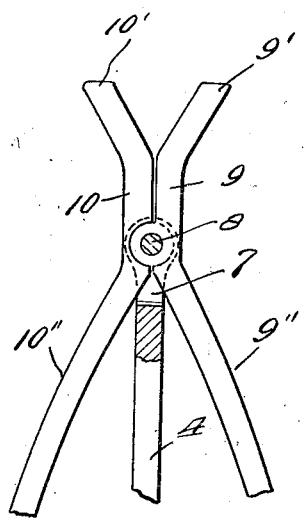
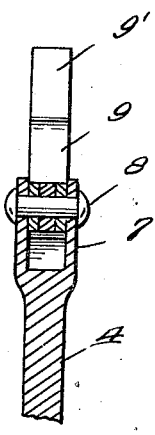
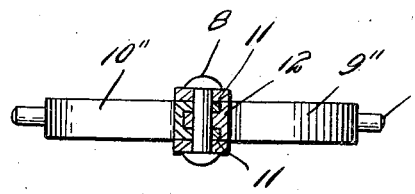

1,505,305

UNITED STATES PATENT OFFICE.

ROY T. BANG, OF MINDEN, NEBRASKA.

REIN HOLDER.

Application filed January 24, 1923. Serial No. 614,584.

*To all whom it may concern:*

Be it known that I, ROY T. BANG, a citizen of the United States, residing at Minden, in the county of Kearney and State of Nebraska, have invented certain new and useful Improvements in Rein Holders, of which the following is a specification.

My invention relates to improvements in rein holders, primarily adapted for application to horse drawn vehicles such as carriages, or wagons, and also to horse drawn agricultural implements, such as plows, cultivators or the like, and has for the primary object thereof, the provision of such a device, that will rigidly hold said reins in a novel and relatively simple manner.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a rear elevational view of a rein holder constructed in accordance with the present invention, the same being shown as conveniently supported upon a carriage wagon or the like.

Figure 2—is a fragmentary enlarged view of the upper end of the holder, a portion of the supporting arm being shown as broken away for more clearly disclosing the rein holding arms secured thereto.

Figure 3—is a fragmentary vertical sectional view upon the line 3—3 of Figure 1.

Figure 4—is a transverse sectional view upon the line 4—4 of Figure 1, looking downwardly in the direction of the arrows, and Figure 5—is a transverse cross sectional view upon the line 5—5 of Figure 1, and also looking downwardly in the direction of the arrows.

With particular reference to the drawings, there is shown a suitable support A, such as the dash of a carriage or wagon, or a portion of an agricultural implement adjacent the operator of this implement. Secured at a convenient point by bolt and nut connections 1, is an angular bracket 2, the central portion of which is substantially U-shaped as shown, and adapted to be received between this U-shaped portion of the bracket and the support A is the angular end 3 of a vertically extending arm or bar 4. Adjacent the angular portion 3 of the arm or bar 4, the same is enlarged as at 5, and has a suitable opening therethrough for receiving the transversely extending round rod 6, which rod is suitably secured in any manner desirable within the opening of the enlargement 5. The upper end of the arm or bar 4 is yoked at 7, and pivotally secured by a pivot pin 8 within this yoked end of the supporting bar is a pair of jaw members 9 and 10. Adjacent the lower end of the jaw member 9, there is formed a pair of laterally extending spaced ears 11, and adjacent the lower end of the jaw member 10, there is formed a central laterally extending ear 12, the projecting portions of these ears being rounded, and the ear 12 extending between the spaced ears 11 whereby these jaw members 9 and 10 are pivotally secured together by the before mentioned pivot pin 8. The upper end of each jaw member 9 and 10 converges outwardly as at 9' and 10', respectively.

Formed upon the lower opposite ends of each jaw member and as an integral part therewith, is a suitably curved arm or bar 9'' and 10'' respectively. Adjacent the lower ends of each of the arms, the same are provided with an opening 13 for permitting the projecting ends of the before mentioned annular rod to extend therethrough. Encircling the rod 6 and between the enlargement 5 of the supporting bar 4 and each arm 9'' and 10'' of the jaws 9 and 10, is a relatively strong coiled spring 14, these coiled springs adapted for normally forcing the arms 9'' and 10'' outwardly for engaging the jaws 9 and 10 in close contact with each other.

In view of the above description, it will be readily understood that the reins may be wedged between the jaws 9 and 10 to be guided to these jaws by the flared ends 9' and 10' thereon, and in view of the spring 14—14, tension will always be provided for engaging these jaws in close contact upon the reins therebetween.

While I have herein shown and described the preferred embodiment of the present invention, it is nevertheless to be distinctly understood that minor changes may be made therein, without departing from the spirit and scope of the invention as claimed.

What I claim as new is:—

In combination with a support, of a bracket carried by the support, and adapted to receive a vertical supporting arm, a pair of jaws pivoted to the upper end of the supporting arm, a cross rod extending through an opening adjacent the lower end of the supporting arm, pendent arms carried by the jaws, and formed with openings for receiving the opposite ends of said cross rod, and expansion springs surrounding said rod between the supporting arm and the said pendent arms for maintaining the jaws closed.

In testimony whereof I affix my signature.

ROY T. BANG.